UNITED STATES PATENT OFFICE.

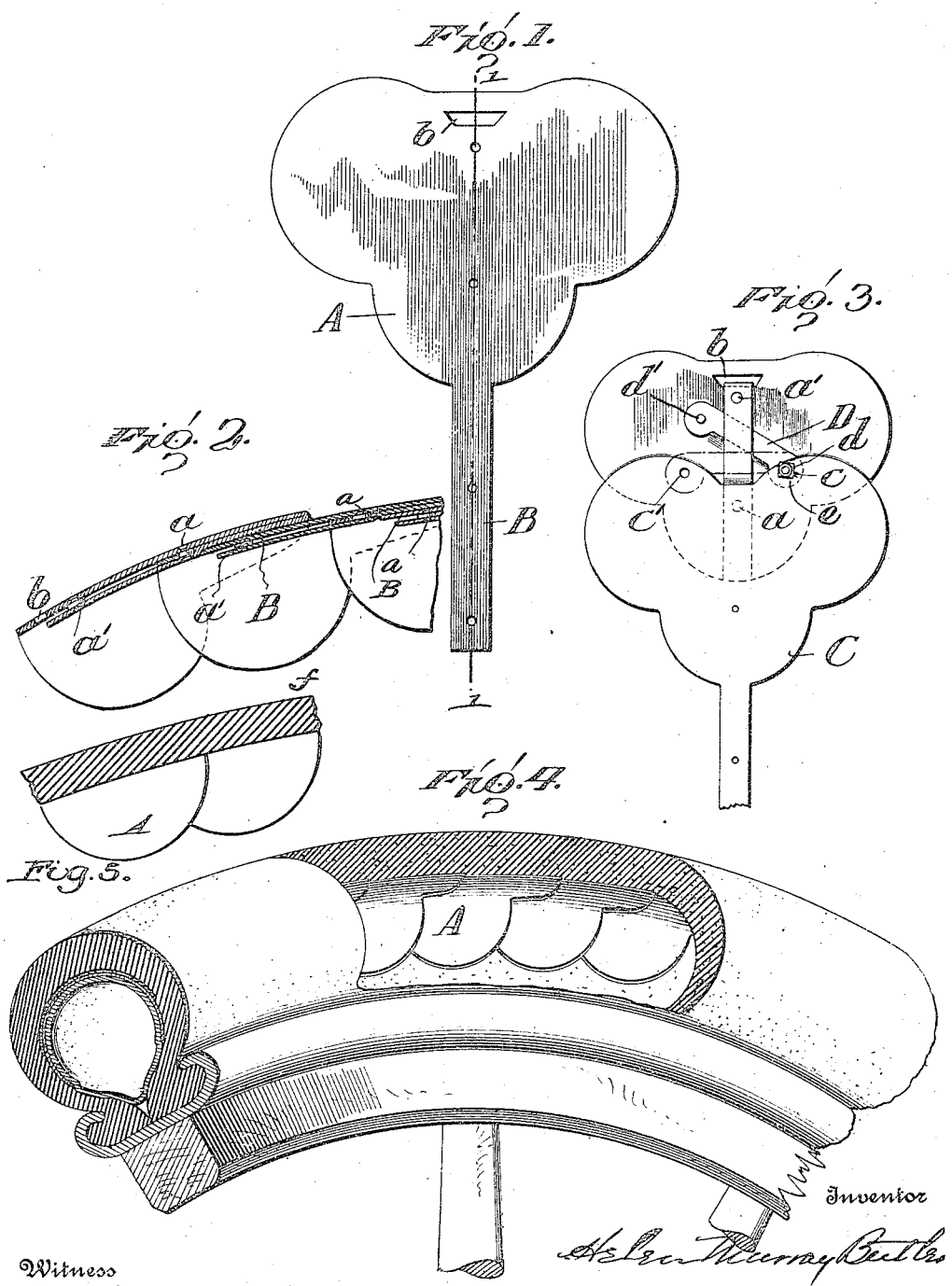

HELEN MURRAY BUTLER, OF MILTON, PENNSYLVANIA.

TIRE-ARMOR.

1,252,394.

Specification of Letters Patent.

Patented Jan. 8, 1918.

Application filed December 20, 1915. Serial No. 67,879.

*To all whom it may concern:*

Be it known that I, HELEN MURRAY BUTLER, a citizen of the United States, residing at Milton, in the county of Northumberland and State of Pennsylvania, have invented a new and useful Tire-Armor, of which the following is a specification.

The object of my invention is to provide a strong, durable and at the same time inexpensive shield or protector for tires, and one especially adapted for use in connection with the rubber tires of automobiles and other motor driven vehicles, and one which is capable of being attached either to the inner tube or the outer cover of a pneumatic tire.

My invention consists in the novel form of the various parts of the protector, and their manner of connection one to another, and in their ability to readily adjust themselves to the altered contour of the tire to which the protector is attached; also in their ability to prevent the ordinary tendency to creep which is incident to many of the tire covers in common use.

In the accompanying drawings, Figure 1 is a face view of one of the plates of the protector, before the same has been bent into shape for use, and is intended to illustrate its general form; Fig. 2 illustrates the method of joining the plates, and represents a series of joined plates in section, on line 1—1 of Fig. 1; Fig. 3 is a view of the armor looking outward; Fig. 4 is a segment of a tire with the outer cover partly broken away, and showing the tire armor arranged in position upon the inner tube. Fig. 5 illustrates a segment of the tire armor with an attached flexible covering.

My device comprises a series of joined plates or shields A, preferably of metal. Primarily each plate is substantially in the form of three overlapping, but eccentric circles, as shown in Fig. 1; though this particular form may be varied to some extent without altering my invention as claimed.

These plates are all similar in size and form, and are so bent and curved as to conform to both the annular and transverse contours of the tire to which the completed series of plates is to be attached.

What may be termed the third or rearward circle of each plate —A—, has a tongue or strap —B— integral therewith, and extending outward therefrom as shown in Fig. 1. This strap is curved both longitudinally and laterally, in arcs of similar contour to those of the plate proper, but in a different direction of curvature, and is adapted to be bent back upon the plate at their point of connection, so that it will rest against the inner face of the plate. When so bent the directions and degrees of curvature of the arcs of the plate and the strap will be similar, and the inner face of the strap will conform in contour to the inner face of its integral plate.

When a strap is bent into position, it is first secured, at a point about midway of its length, to the face of the plate against which its lies, by a rivet —a—.

The two remaining forward circles of the plate do not meet as true circles, but their outlines join in the form of a slight inward curve. See Fig. 1.

Near the forward end of the plate and opposite and transverse to the strap —B—, is a slot —b—. The length of this strap is such that when it is bent back upon the plate, it will not extend beyond, or cover the slot —b— therein.

In joining the plates one to another, the free end of the strap of the forward plate is passed through the slot of a succeeding plate from above, and the strap is then again secured near its extremity to the face of its own plate, by a rivet —a'—, similar to the rivet —a—. This process is continued until the circle of the plates is complete. It is apparent that there will then be formed a continuous series of overlapping shields. When attached to a tire the armor is placed so that its outer overlapping portions will extend in a direction opposite to the forward turn of the wheel to which the tire belongs, and it thus presents an unbroken surface as the wheel turns forward, which prevents gravel and other matter from being forced between the joined plates.

This protector is equally well adapted for attachment to either the inner tube or the outer casing of a pneumatic tire, the only difference being that when the protector is intended to cover the outer casing, one of larger dimension is needed than when it is for use upon the inner tube. When the protector is to be used upon the inner tube, a flexible covering of canvas or leather or other suitable material may be attached by rivets, or otherwise, to the inner surface of the connected series of shields. Its object being to protect the soft inner tube of the tire from the friction of the plates. Such a covering, because of its flexible character, will not interfere with the sliding movement of the plates one upon another, hereinafter referred to. It is believed, however, that in actual use such a covering will be found unnecessary, and it is not shown in any of the drawings as its nature and design are easily understood.

The method of attaching the protector is the same whether it is attached to the inner tube or the outer casing of the tire.

In fastening a bent strap to its plate, the connecting rivets —a— and —a'— should have extended shanks so as to prevent the strap from bearing directly against the surface of the plate. This will provide a space between the plate and the strap, bounded at either end by lugs. The space thus formed between the strap and the plate should be of sufficient width to permit the succeeding joined plate to slide backward and forward upon the strap —B—, and the extent of its travel will be limited by the lugs —a— and —a'—.

The rivet —a— of each plate is so located that when the plates are joined in series, and attached to a tire, the tread of the tire will at all times be protected by the thickness of the overlapping portions of two plates. This is accomplished by so placing the rivet —a— on its plate, that when three plates are joined one to another, and the two forward plates are drawn outward to their full extent of travel, and until each is stopped by its own rivet lug —a—, the forward curved edge of the third, or last plate will rest at a point on the inner face of the middle plate, which corresponds with a point on the outer face of the same plate which marks the rearward extension of the overlapping portion of the first and foremost of the three plates; and so on throughout the series. This is shown in Fig. 2. While it is well to thus join the plates, this exact method of relation is not absolutely essential to my invention.

A convenient method of connecting the end plates of the joined series, when the armor is to be attached to a tire, is shown in Fig. 3. As there illustrated, that portion of the last plate —C— of the series, forward of the point corresponding to slot —b— in the other plates, is broken away. On opposite sides of this plate —C—, near its forward edges, are the bores —c— and —c'—. —D— is a flat bar having on one of its faces, and at opposite ends, the short threaded lugs —d— and —d'—. These lugs are so placed and are of such size that when the bar —D— is placed in proper position against the outer face of the plate —C—, these lugs —d— and —d'— will register with and pass through the bores —c— and —c'— in the plate. The inner protruding threaded ends of the lugs are adapted to receive the nuts —e— and —e'— (only the nut —e— is shown in Fig. 3), and by this means the bar —D— can be firmly held against the outer face of the plate —C—. Should the metal of the plate be thick enough, the nuts —e— and —e'— can be somewhat sunken, so as to preserve a flat inner surface; but this will not be found essential in actual use.

The bar —D— is so placed and is of such width that when thus secured to the plate, it leaves an opening between its inner edge and the outer edge of the plate, corresponding to the slot —b— in the other plates of the series.

When it is desired to attach the armor to a tire and join the meeting ends of the completed series of plates, the tire is partially deflated. It is then surrounded by the armor, and the bar —D— is slipped beneath the strap —B— of the first plate of the series, with its lugs extending outward. The plate —C—, the last plate of the series, is drawn forward and its bores —c— and —c'— brought into registration and engagement with the lugs —a— and —a'— of the bar —D—, and the nuts —e— and —e'— are then turned upon the protruding ends of these lugs, on the inner face of the plate —C—.

If preferred, threaded bolts may be substituted for the lugs —d— and —d'—, in which event the bar —D— will be provided with bores adapted to register with the bores —c— and —c'— of plate —C—; and through these registering bores the bolts will pass, and their threaded ends will be secured on the inner face of plate —C— by means of the nuts —e— and —e'—.

All of the foregoing can be readily done when the tire is deflated. When the protector is attached to the outer casing of a tire, and the tire is inflated, the tire will bind closely against the plates, and they will form a complete, strong and elastic covering for the entire exposed surface of the tire, protecting alike both its sides and tread. If the protector has been attached to the inner tube of the tire, the inflation of the same will hold the protector closely between the opposed walls of the tube and the outer casing, where it will form an impenetrable armor, completely protecting the inner tube from the results of injury to the outer casing, by reason of puncture, cutting or otherwise.

By reason of their ability to slide one upon the other, the plates of the series readily adjust themselves to the contour of the tire when altered by partial deflation, by extreme or sudden pressure, or from other causes. This feature of my invention also relieves any tendency the complete covering might have to creep upon the surface of the tire, whether applied to its inner or outer casing.

Having now fully described my invention, what I claim is:

A tire protector comprising overlapping ends, the underlapped end being provided with a strap projecting longitudinally of the protector, bent back and secured to the protector forming a loop, the overlapping end being provided with a pair of bores or openings in its edge, a transverse bar located under the loop of the underlapped end, threaded lugs on the transverse bar passed through the bores of the overlapped end, and nuts on the threaded lugs.

HELEN MURRAY BUTLER.

Witnesses:
ELIZA M. DOUGAL,
AGNES B. DOUGAL.